(12) United States Patent
Sugamata et al.

(10) Patent No.: US 6,522,792 B1
(45) Date of Patent: Feb. 18, 2003

(54) LIGHT MODULATOR OF WAVEGUIDE TYPE

(75) Inventors: Tohru Sugamata, Funabashi (JP);
Yasuyuki Miyama, Funabashi (JP);
Yoshihiro Hashimoto, Funabashi (JP)

(73) Assignee: Sumitomo Osaka Cement Co., Ltd., Tokyo (JP)

(*) Notice: Subject to any disclaimer, the term of this patent is extended or adjusted under 35 U.S.C. 154(b) by 0 days.

(21) Appl. No.: 09/529,223

(22) PCT Filed: Aug. 10, 1999

(86) PCT No.: PCT/JP99/04321

§ 371 (c)(1),
(2), (4) Date: Apr. 10, 2000

(87) PCT Pub. No.: WO00/10052

PCT Pub. Date: Feb. 24, 2000

(30) Foreign Application Priority Data

Aug. 10, 1998 (JP) ............................................. 10-225996
Feb. 5, 1999 (JP) ............................................. 11-028361

(51) Int. Cl.[7] .......................... G02F 1/035; G02F 1/295
(52) U.S. Cl. ..................... 385/2; 385/4; 385/8; 385/9; 385/129
(58) Field of Search .............................. 385/1–3, 4, 8, 385/9, 39–45, 129–132

(56) References Cited

U.S. PATENT DOCUMENTS 5,138,480 A * 8/1992 Dolfi et al. ..................... 385/2
5,617,493 A * 4/1997 Nishimoto ..................... 385/40
5,790,719 A * 8/1998 Mitomi et al. ................... 385/2
6,021,232 A * 2/2000 Madabhushi .................... 385/3

FOREIGN PATENT DOCUMENTS

| JP | 60-104821 | 7/1985 |
| JP | 4-149408 | 5/1992 |
| JP | 4-254819 | 9/1992 |
| JP | 5-196902 | 8/1993 |
| JP | 8-166565 | 6/1996 |
| JP | 9-171163 | 6/1997 |
| JP | 9-258152 | 10/1997 |
| JP | 10-3065 | 1/1998 |
| JP | 10-274758 | 10/1998 |

OTHER PUBLICATIONS

Chung et al, Modeling and Optimization of Traveling–Wave LiNbO3 Interferometric Modulators, Mar. 1991, IEEE Journal of Quantum Electronices, vol. 27, No. 3.*
H. Miyamoto et al., "Evaluation of $LiNbO_3$ Intensity Modulator Using Electrodes Buried in Buffer Layer", Electronics Letters, vol. 28, No. 11, May 1992, pp. 976–977.

* cited by examiner

Primary Examiner—Rodney Bovernick
Assistant Examiner—Juliana K. Kang
(74) Attorney, Agent, or Firm—Young & Thompson

(57) ABSTRACT

An optical waveguide modulator 40 has a substrate 1 made of a material with an electrooptic effect, an optical waveguide 2 to guide a lightwave 2, a travelling wave-type signal electrode 3 and the ground electrodes 4 to control the lightwave. Moreover, it has a buffer layer 6, at least a part thereof being embedded in the superficial layer of the substrate 1, having a larger width "W" than a width "ω" of the travelling wave-type signal electrode 3 only under the signal electrode 3 and its nearby part.

9 Claims, 9 Drawing Sheets

LIGHT MODULATOR OF WAVEGUIDE TYPE

TECHNICAL FIELD

This invention relates to an optical waveguide modulator configuration, particularly, an optical waveguide modulator configuration preferably applied to waveguide type optical intensity-modulators, phase-modulators, and polarization scramblers employed in high speed and large capacity optical fiber-communication systems and wavelength division multiplexing systems.

BACKGROUND ART

With the recent advances in high speed and large capacity optical fiber-communication systems, from the viewpoint of broad bandwidth, low chirp and low propagation loss characteristics, waveguide type external modulators using substrates made of lithium niobate (LiNbO$_3$: hereinafter often abbreviated to "LN") are being realized, rather than conventional diodes which are direct-modulation type.

FIG. 1 is a cross sectional view showing an example of a conventional optical waveguide modulator.

An optical waveguide modulator 10, as shown in FIG. 1, has a substrate 1 made of "LN" etc., a Mach-Zehnder type interferometer 2, formed by thermal diffusion of Ti into the substrat 1, a travelling wave-type signal electrode 3 and ground electrodes 4 made of Au that is applied directly on the optical waveguide 2, or on a nearby surface.

Moreover, for lowering the absorption loss of the lightwave travelling in the optical waveguide 2 by the travelling wave-type signal electrode 3 and the ground electrodes 4 and matching of velocity between the lightwave and microwave travelling on the signal electrode 3, a buffer layer 5 made of silicon dioxide (SiO$_2$) is formed between the substrate 1 and the signal electrode 3 and the ground electrode 4.

Furthermore, with the developments in recent optical communication systems, multi-functions as well as high speeds and large capacity are required. In particular, the wavelength-multiplexing in the same optical waveguide, the switching and the exchanging of optical transmission guides are sought. Such communication systems are being realized with a wavelength division multiplexing method (hereinafter often abbreviated to "WDM system") using an optical fiber amplifier (hereinafter often abbreviated to "EDFA").

The WDM system transmit, by a single optical fiber, multiple lightwaves having different wavelengths from the corresponding optical sources, to each lightwave being modulated by one of the different signals. That is, the system requires to prepare multiple optical modulators each connected with the corresponding optical source, and any one of the signals modulated by the multiple optical modulators is transmitted by a single optical fiber. The EDFA is provided in its transmission guide to amplify the gain of transmitted lightwave.

The WDM system enables the transmission capacity of the whole communication system to be increased without augmenting the number of optical fibers and the bit rate of each signal.

The WDM system requires the transmission condition of each lightwave to be constant. However, there is a problem that received intensity of an optical signal at the detector sometimes fluctuate in each transmitted lightwaves, on account of the wavelength dependency of the EDFA's gain and the change of the output power with time from each optical source, etc.

To overcome this problem, the integration of an attenuator with each of the optical modulator is being attempted. FIG. 2 is a top plan view showing an example of a conventional optical waveguide modulator to which an attenuator is integrated. FIGS. 3(a) and 3(b) are cross sectional views of the optical modulator shown in FIG. 2. FIG. 3a is a cross sectional view of an optical modulation part, taken on line A–A' of FIG. 2, and FIG. 3b is a cross sectional view of an attenuator part, taken on line B–B' of FIG. 2.

A conventional optical waveguide modulator 30 shown in FIG. 2 and 3 has a substrate 11 made of a material having an electrooptic effect, a first interferometer 12 and a second interferometer 13 formed by thermal diffusion of Ti into the substrate. Then, it has a buffer layer 14 made of silicon dioxide, etc. formed on the substrate 11. On the buffer layer 14 are formed a first signal electrode 15, first ground electrodes 16, a second signal electrode 17 and second ground electrodes 18.

Electrical inputs of the first and the second signal electrodes 15 and 16, are connected with external electric power supplies 21 and 22, respectively, the output of the first signal electrode 15 being terminated via a resistor "R" and a capacitor "C". Metal-cladding type waveguide polarizers 23 and 24 are provided in the input and output sides of the optical modulator 30.

The first interferometer 12, the first signal electrode 15 and the first ground electrodes 16 constitute an optical modulation part 28. The second optical waveguide 13, the second signal electrode 17 and the second ground electrodes 18 constitute an attenuator part 29. The first signal electrode 15 and the first ground electrodes 16 constitute an electrode for modulation. The second signal electrode 17 and the second ground electrodes 18 constitute an electrode for attenuation. And, the first interferometer 12 is in series connected with the second interferometer 13 in the boundary "H" between the optical modulation part 28 and the attenuator part 29. The arrow in FIG. 2 depicts a travelling direction of a lightwave.

The buffer layer 14 is formed to prevent the absorption of the lightwave guiding in the optical waveguide by the modulation electrode and the attenuator electrode.

When a lightwave having a wavelength of λ1 is incident into the optical waveguide modulator 30, it is on-off switched and thereafter its intensity is controlled in attenuator part 29. That is, by compulsive attenuation of the intensities of specific optical signals having large output powers, the intensity of each optical signal having different wavelengths, is equalized in the whole communication system.

Such an optical waveguide modulator, as shown in FIG. 1, is desired to be enhanced in modulation efficiency in view of reducing the load for a high frequency driver. Thus, the distance between the optical waveguide and the travelling type signal electrode and electrode gap are required to be shorter and narrower, respectively, to lower the driving voltage of the optical modulator.

However, as shown in the optical waveguide modulator 10 in FIG. 1, when the buffer layer 5 is formed between the substrate 1 and the travelling type signal electrode 3 or the like, the distance between the optical waveguide 2 and the signal electrode 3 is inevitably increased and thereby the driving voltage can not be efficiently lowered.

Moreover, such an optical waveguide modulator as in FIGS. 2 and 3, is required to have relatively longer interaction length in optical modulation part 28 to realize low driving voltage. However, in the optical waveguide modulator having above-mentioned configuration, the attenuator part 29 can not have sufficient length because of limitation in wafer size. As a result, attenuator part 29 requires a very high driving voltage.

If the driving voltage is being higher, an electric discharge sometimes occur in the electrodes of the attenuator part 29, resulting in the destruction of the optical waveguide modulator 30 itself. Thus, the above optical modulator does not have a sufficient reliability.

In addition, if the driving voltage is being higher, there is practical problem that a DC drift due to the buffer layer 14 tends to be larger.

It is an object of the present invention to provide a new optical waveguide modulator configuration capable of reducing driving voltage in an optical modulation part or an attenuator part.

DESCRIPTION OF THE INVENTION

The first optical waveguide modulator applying the present invention has a substrate made of a material having an electrooptic effect, an optical waveguide to guide a lightwave, travelling wave-type signal electrode, ground electrodes and a buffer layer between the substrate and the above travelling wave-type electrodes. The buffer layer is formed only under the travelling wave-type signal electrodes so as to have a larger width than that of the travelling wave-type signal electrode and, at least a part of the buffer layer is embedded in a superficial layer of the substrate.

As above-mentioned, the conventional optical waveguide modulator 10, as shown in FIG. 1, has the buffer layer 5 on the entire main surface 1a of the substrate 1. However, there is a problem that the affection of the buffer layer under the signal electrode on the velocity matching between the lightwave in the optical waveguide and the microwave travelling in the signal electrode is not examined in detail.

From the standpoint of above-mentioned problem, present inventors examined about the buffer layer structure in detail.

As a result, they found the following fact:

The impedance matching of the electrodes and the velocity matching between the lightwave and the microwave are dominantly influenced by the part of the buffer layer under the travelling wave-type signal electrode and its nearby part, not so the part of the buffer layer under the ground electrodes and their nearby parts. It is also clarified that the driving voltage of the modulator is also influenced by the width of the buffer layer under the travelling wave-type signal electrode and its nearby part.

Moreover, the present inventors also found that the driving voltage depends on, surprisingly, whether the part of the buffer layer under the travelling wave-type signal electrode and its nearby part is embedded in the superficial layer of the substrate or not, and its embedded depth.

That is, the formation of the buffer layer having a larger width than that of the travelling wave-type signal electrode only under the signal electrode and its nearby part enables the driving voltage of the modulator to be reduced and the embedding of at least a part of the buffer layer into the superficial layer of the substrate enables the driving voltage to be reduced.

The first optical waveguide modulator according to the present invention was invented on the basis of the above facts obtained from extensive research by present inventors.

According to the modulator configuration by this invention, the absorption loss of the lightwave due to the electrodes can be reduced and the velocity matching between the lightwave and the microwave be achieved. In addition, it was found that it can reduce the driving voltage of the modulator and thereby the optical waveguide modulator having an improved modulation efficiency can be obtained.

Furthermore, the buffer layer may expect to be contaminated with impurity such as iron or sodium, in its fabrication process or absorb moisture with time. Thus, the formation of the buffer layer only under the travelling wave-type signal electrode and its nearby part according to the present invention, enables the absolute amount of impurities and the absorbed moisture to be reduced. As a result, these additional effects can prevent the fluctuation of the modulator characteristics and the increase of propagation loss of microwave due to the absorbed moisture in the buffer layer.

Herein, the wording "the width of the travelling wave-type signal electrode" means the width of the face contacting with the buffer layer of the travelling wave-type signal electrode.

On the other hand, a second optical waveguide modulator, of the present invention, has an optical modulation part including a substrate made of a material having an electrooptic effect, a first Mach-Zehnder type interferometer formed on the substrate and an electrode for modulating, and an attenuator part including the substrate, a second Mach-Zehnder type interferometer in series connected with the first interferometer and an electrode for attenuating. Moreover, a buffer layer is formed on the. substrate, the thickness of the buffer layer in the attenuator part being thinner than that in the optical modulation part.

The present inventors have intensively studied to reduce the driving voltage of the attenuator part and found the following facts:

FIG. 4 is a graph showing the relation, found by the inventors, between the thickness "T" of the buffer layer in the attenuator part and the half-wavelength voltage "Vπ" as the driving voltage. As is apparent from the graph, surprisingly, the half-wavelength voltage "Vπ" decreases almost linearly without exhibiting its minimum value as the thickness of the buffer layer decreases.

In the case that the buffer layer is not formed on the substrate area having the attenuator part, the optical absorption of the attenuator electrode is very small.

The second optical waveguide modulator according to the present invention is derived from the basis of the above findings.

According to the second optical waveguide modulator of the present invention, since the thickness of the buffer layer in the attenuator part is thinner than that of the optical modulation part, the driving voltage of the attenuator part can be decreased. As a result, the electric discharge in the attenuator can be prevented. Moreover, in the case of not forming the buffer layer, DC drift, due to the buffer layer, can be inhibited. As a result, the optical waveguide modulator which has enough reliability for practical use can be provided.

BRIEF DESCRIPTION OF DRAWINGS

The invention will be more particularly described with reference to the accompanying drawings, in which.

BEST MODE FOR CARRYING OUT THE INVENTION

Figure 1:
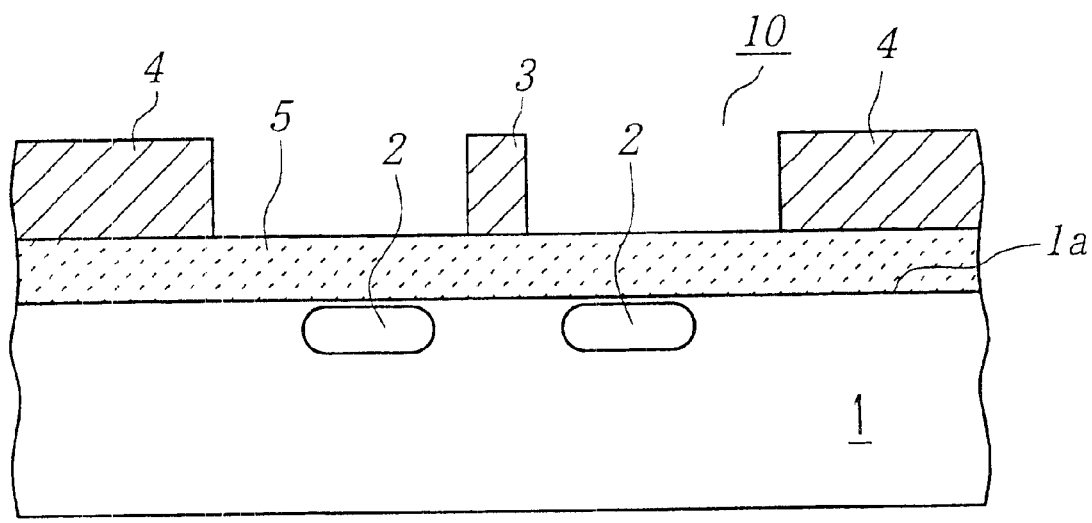
FIG. 1 is a cross sectional view showing an example of the conventional optical waveguide modulator.
Figure 2:
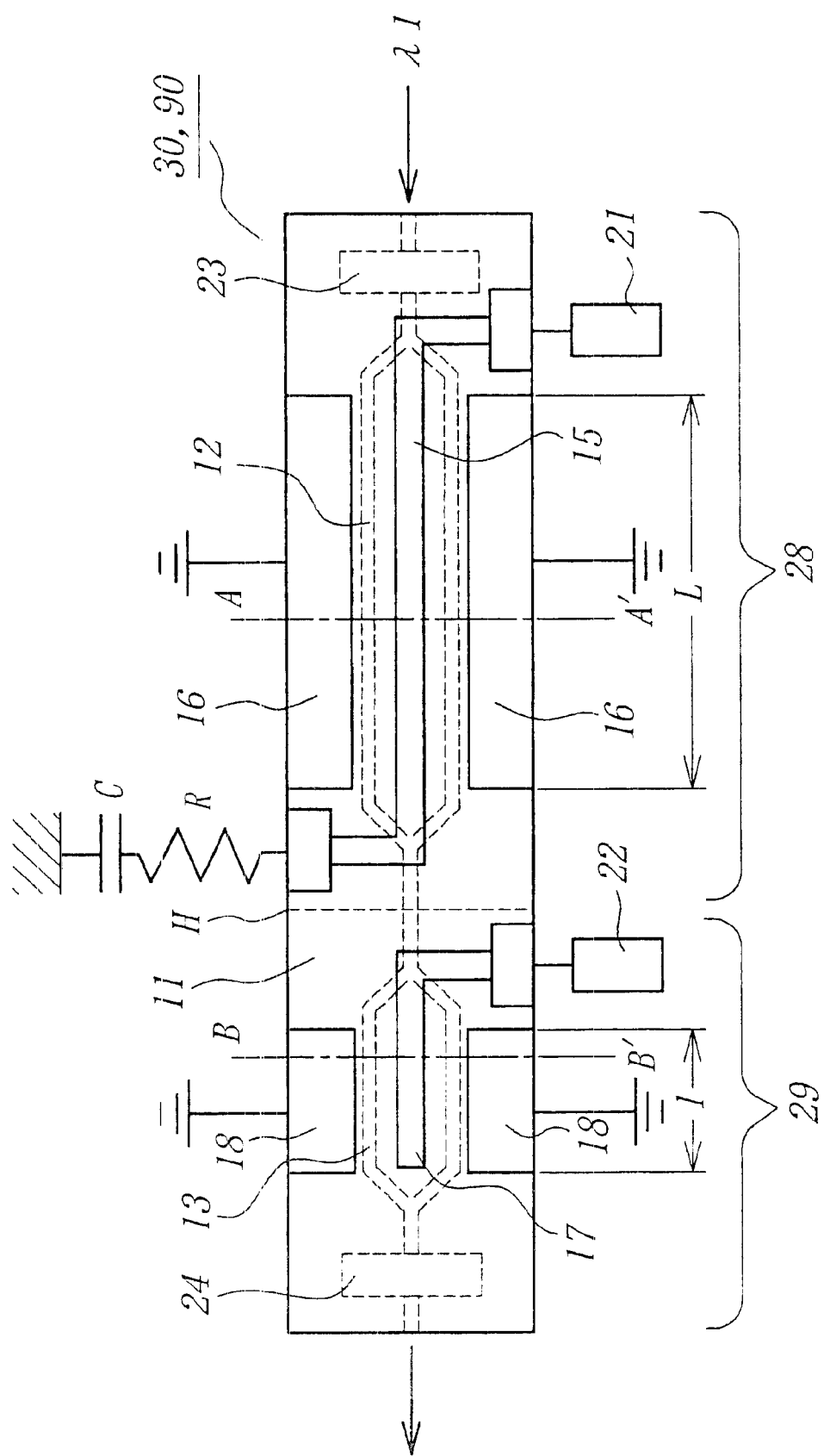
FIG. 2 is a plan view showing another example of the optical waveguide modulator of the conventional and the present invention's optical waveguide modulator.
Figure 3A:
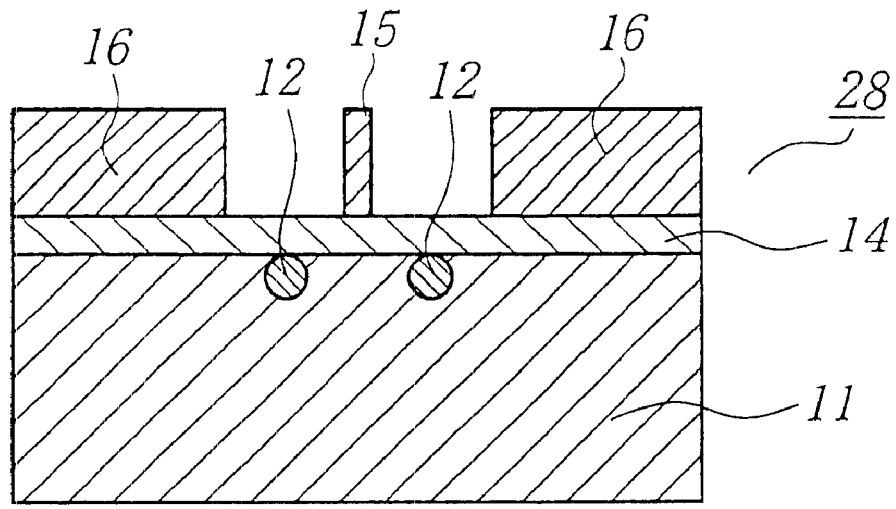
FIGS. 3(a) and 3(b) are cross sectional views of the modulator shown in FIG. 2.
Figure 3B:
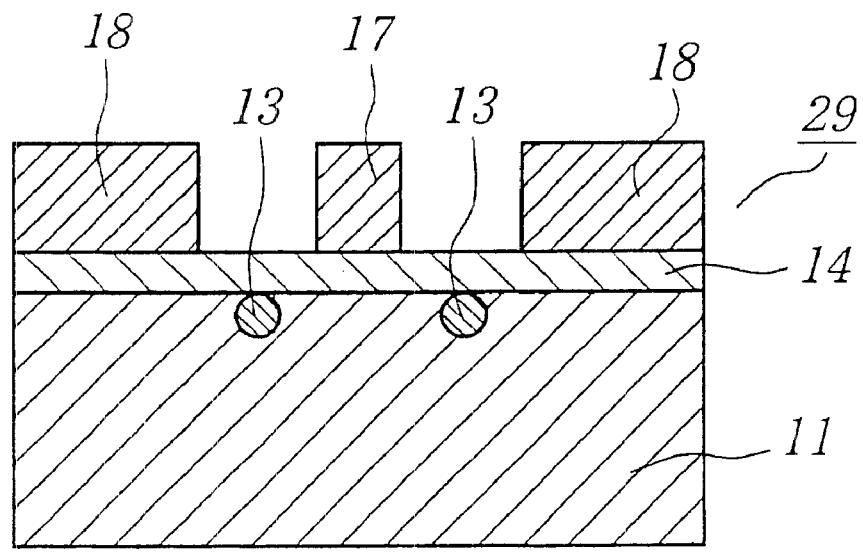
Figure 4:
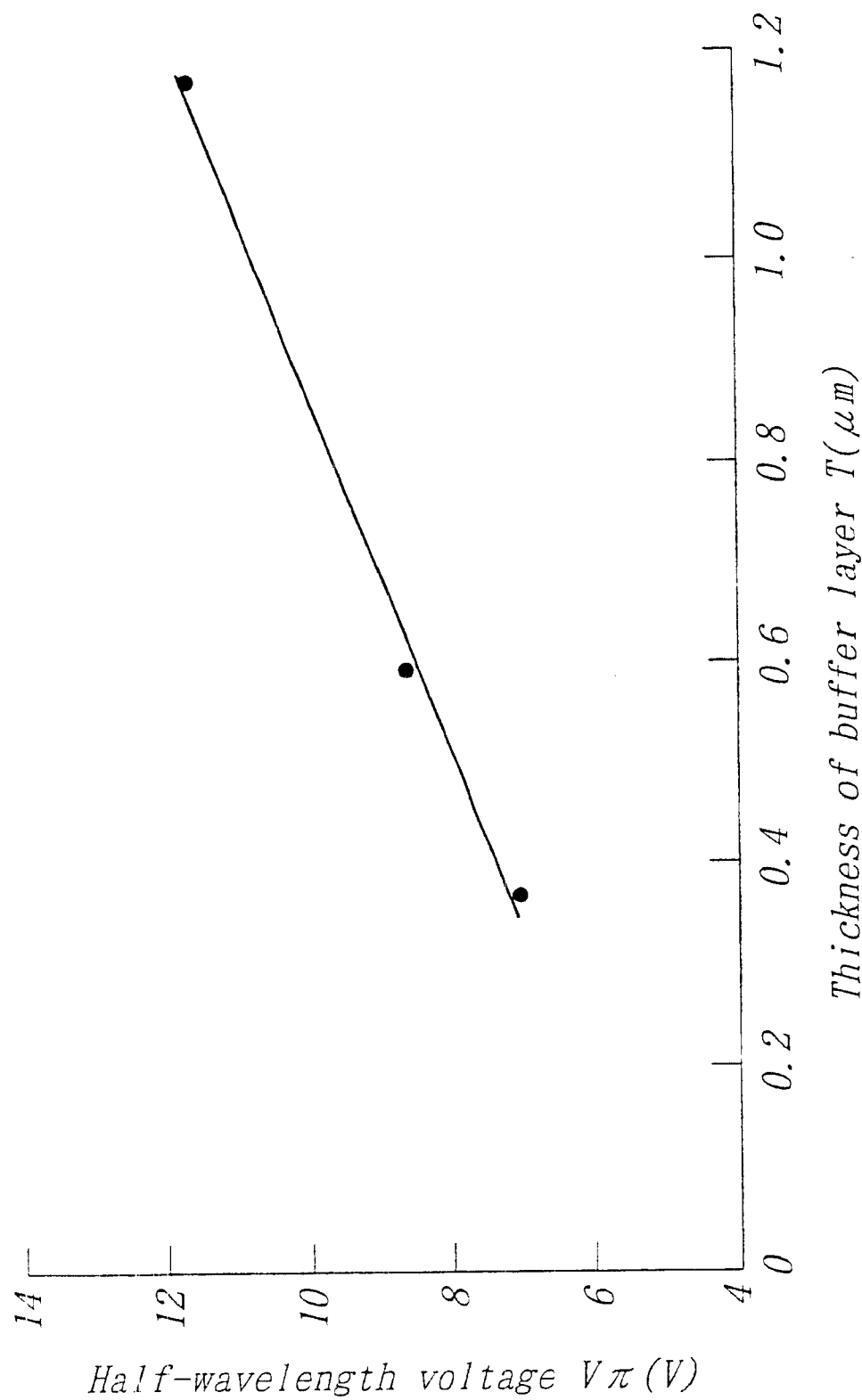
FIG. 4 is a graph showing the relation between the driving voltage and the thickness of the buffer layer in the attenuator part in the optical waveguide modulator.
Figure 5:
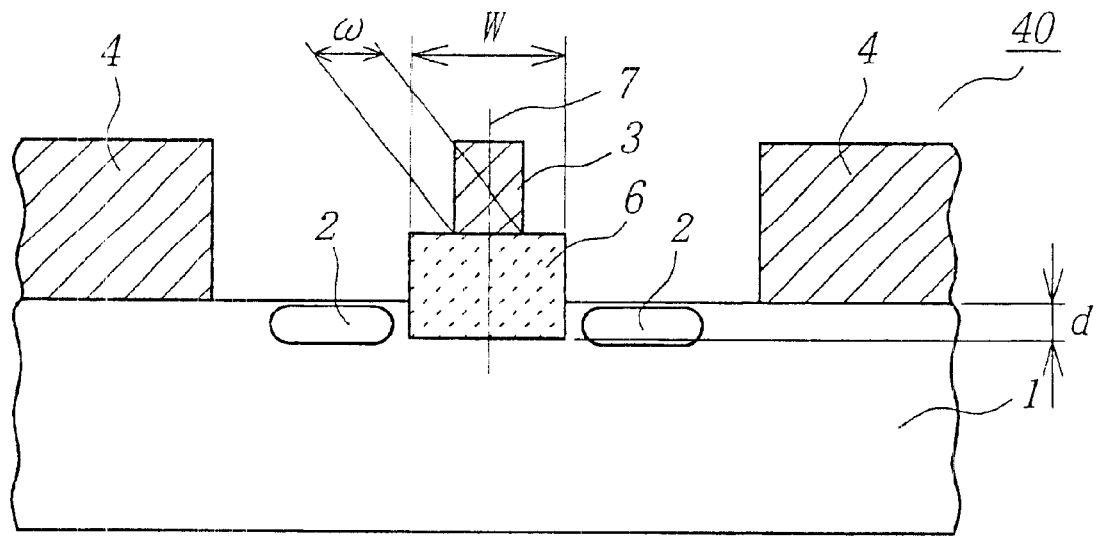
FIG. 5 is a cross sectional view showing an example of the first optical waveguide modulator of the present invention.

The invention will be described in detail with reference to the above drawings as follows:

FIG. 5 is a cross sectional view showing an example of the first optical waveguide modulator according to the present invention. Hereupon, the similar parts in the following figures to ones in FIGS. 1 to 3 are depicted by the same numeral.

An optical waveguide modulator 40, shown in FIG. 5, has the substrate 1 made of a material with an electrooptic effect, the optical waveguide 2 to guide a lightwave, the travelling wave-type signal electrode 3 and the ground electrodes 4. And a buffer layer 6, embedded in the superficial layer of the substrate 1 is formed only under the electrode 3 and its nearby part, having a width "W" larger than the width "ω" of the electrode 3.

The position of the travelling wave-type signal electrode on the buffer layer is not limited if the buffer layer is so located that both sides are beyond the both sides of the electrode. From the reasons for applying the electrical field of microwave symmetrically to each optical waveguide and keeping the chirp of the modulator to be zero, etc., the travelling wave-type signal electrode 3 is preferably formed symmetrically to the center axis 7 of the buffer layer 6.

In the present invention, for lowering the driving voltage of the modulator, the width of the travelling wave-type signal electrode is preferably determined so as to enhance the interaction between the microwave travelling in the signal electrode and the lightwave guiding in the optical waveguide. Concretely, the optical waveguide modulator 40, shown in FIG. 5 preferably has a "W/ω" ratio of 1.3 to 6, more preferably 1.5 to 3, which is a ratio of the width "W" of the buffer layer 6 to the width "ω" of signal electrode 3.

The width "ω" of the travelling wave-type signal electrode 3, as shown in FIG. 5, as above-mentioned, is the width of the face of the signal electrode 3 contacting the buffer layer 6.

The width "W" of the buffer layer 6 is preferably 6.5–42μm, more preferably 7.5–21 μm since the width "ω" of the travelling wave-type signal electrode 3 is usually set to be 5–7μm, according to the width of the optical waveguide, its designed characteristic impedance and an effective refractive index of a microwave as the electrical signal.

The embedding depth of the buffer layer into the superficial layer of the substrate is not restricted if the driving voltage can be reduced by employing the configuration of the optical waveguide modulator according to the present invention. However, in the case of the optical waveguide modulator 40, the embedded depth "d" in the superficial layer of the substrate 1 is preferably 5–10μm, more preferably 6–8μm. Thereby, the driving voltage of the modulator can be further lowered and the effective refractive index of the microwave can be reduced. The reduction of the effective refractive index improves the velocity matching between the lightwave and microwave to be capable of broadening the modulation bandwidth of the optical waveguide modulator.

Figure 6:
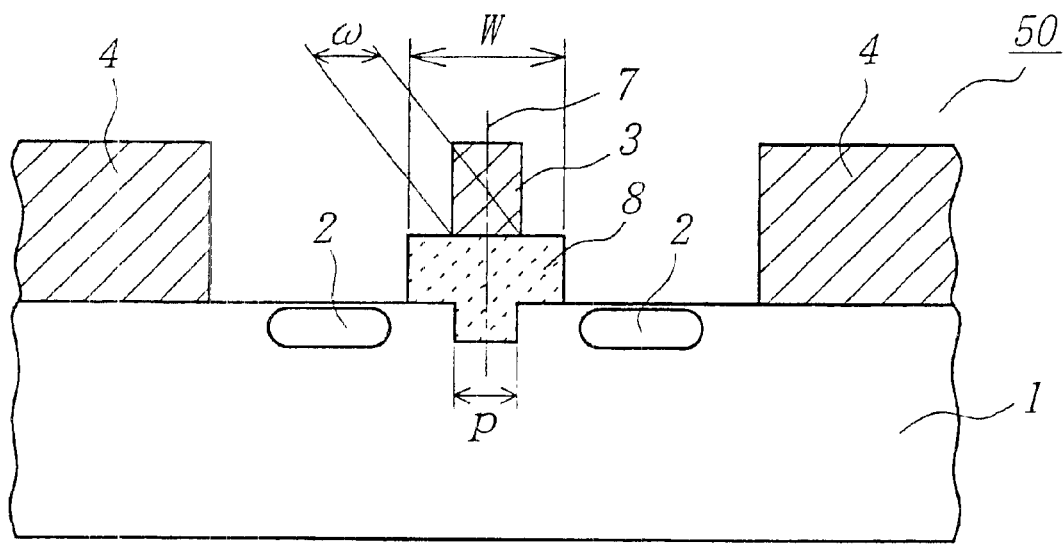
FIG. 6 is a cross sectional view showing a variant example of the modulator shown in FIG. 5.

FIG. 6 is a cross sectional view showing a variant example of the optical waveguide modulator shown in FIG. 5. An optical waveguide modulator 50, shown in FIG. 6, has a buffer layer 8 in which the center part of the buffer layer 8 having a width "p" is embedded in the superficial layer of the substrate 1, which is different from the modulator 40, shown in FIG. 5.

In such a case of embedding the part of the buffer layer into the superficial layer of the substrate, the effective refractive index of the microwave travelling in signal electrode and the electrical characteristic impedance in the whole optical modulator can be adjusted. Thereby, the modulator is optimized according to the desired operation bandwidth thereof and the excess loss of the lightwave guiding in the optical waveguide can be lowered.

Figure 7:
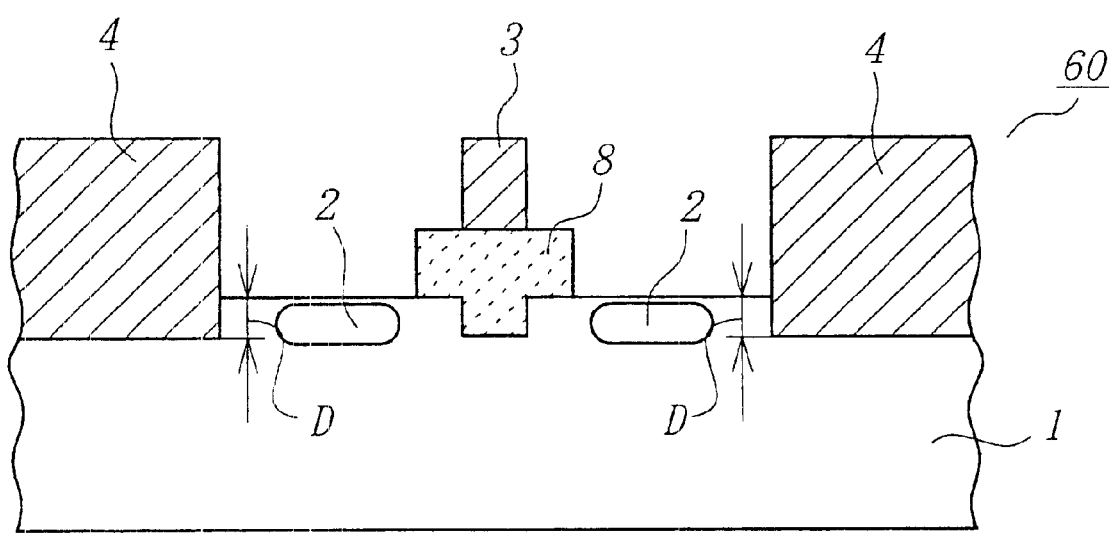
FIG. 7 is a cross sectional view showing a variant example of the modulator shown in FIG. 6.

FIG. 7 is a cross sectional view showing a variant example of the optical waveguide modulator shown in FIG. 6.

An optical waveguide modulator 60 shown in FIG. 7 has ground electrodes 4 embedded in the superficial layer of the substrate 1. Such a modulator having the ground electrodes of which at least a part of them is embedded in the superficial layer of the substrate enables the driving voltage of the optical waveguide modulator to be extremely lowered.

The embedded depth of the ground electrode in the superficial layer of the substrate is not particularly limited, but in the optical waveguide modulator 60 shown in FIG. 7, the embedded depth "D" is preferably 5–10 μm, more preferably 6–8 μm. For even reduction of the driving voltage in the branched right-and-left optical waveguides 2, the right-and-left ground electrodes preferably have the same embedded depth "D".

Figure 8:
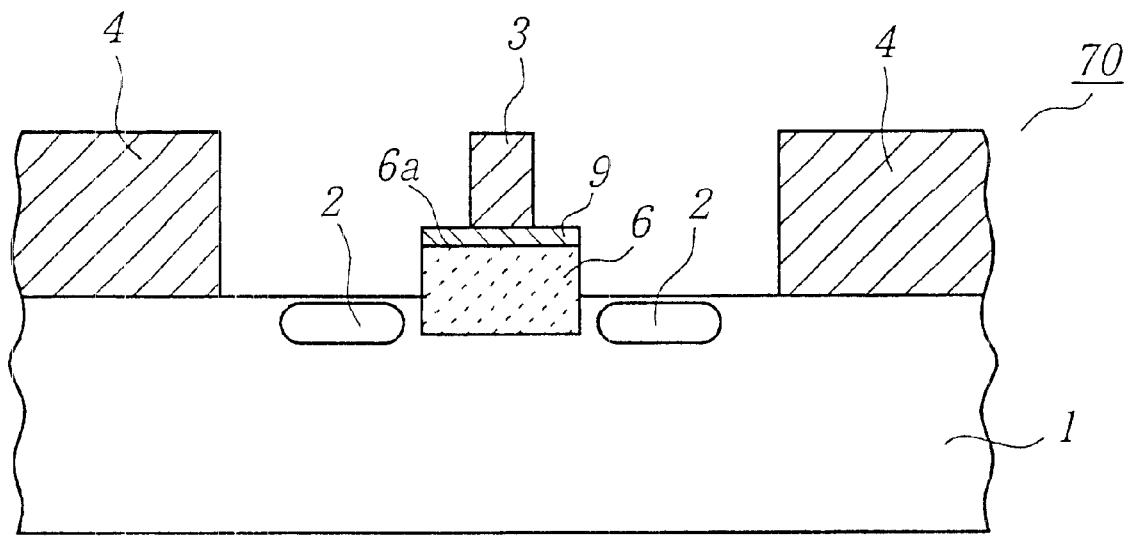
FIG. 8 is a cross sectional view showing an example of the modulator having a passivating film on the buffer layer in the modulator according to the present invention.
Figure 9:
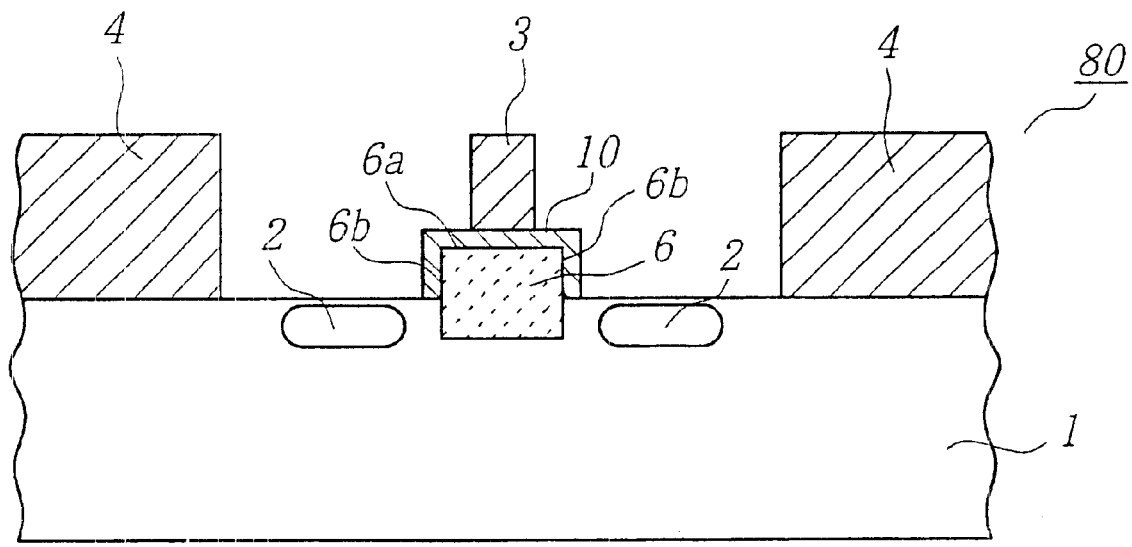
FIG. 9 is a cross sectional view showing another example of the modulator having a passivating film on the buffer layer in the modulator according to the preset invention, FIGS. 10(a) and 10(b) a cross sectional views of further example of the optical waveguide modulator according to the present invention.

FIGS. 8 and 9 are cross sectional views showing other examples of the optical waveguide modulator according to the present invention.

An optical waveguide modulator 70, shown in FIG. 8, has a passivating film 9 on the main surface 6a of the buffer layer 6 on which the travelling wave-type signal electrode 3 is formed. On the other hand, an optical waveguide modulator 80 shown in FIG. 9, has a passivating film 10 on the side face 6b of the buffer layer 6 besides the main surface 6a.

The formation of the passivating film, at least on the main surface of buffer layer on which the travelling wave signal electrode is formed enables the propagation loss of microwave due to the moisture absorbed into the buffer layer, to be reduced.

The material applicable for the passivating films 9 and 10 is not restricted if it can prevent the absorption of the moisture into the buffer layer. However, the passivating film is preferably made of at least one of a nitride such as SiN or Si—O—N and a silicon because a dense film of them is easily obtained.

The buffer layer in the present invention may be made of a well known material, such as silicon dioxide or alumina.

The travelling wave-type signal electrode and ground electrode may be made of a well known metallic material such as Au, Ag, or Cu, having a high conductivity and capable of being easily plated.

The substrate in the present invention is not limited if it is made of a material having an electrooptic effect. A material such as lithium niobate, lithium tantalate (LiTaO$_3$) or lead lanthanum zirconate titanate (PLZT) may be used. When the substrate is made of such a material, its main surface may be composed of every kind of cut face such as an X-cut face, Y-cut face, or Z-cut face in the material.

In the case of making the substrate of the material such as lithium niobate, in view of lowering propagation loss of lightwave and preventing the degradation of the electrooptic effect, the optical waveguide is preferably formed by doping elements such as Ti, Ni, Cu or Cr, into the substrate through a thermal diffusion method.

A fabrication process of the optical waveguide modulator according to the present invention will be described hereinafter, with reference to the drawings.

First of all, a photoresist for fabricating an optical waveguide pattern is spin-coated in a thickness of 0.5 μm on the substrate 1, made of lithium niobate, etc., and thereafter is exposed and developed to form an optical waveguide pattern having a width of 6–8 μm.

Then, a layer made of an optical waveguide-forming substance such as Ti is deposited in a thickness of about 800 Å on the optical waveguide pattern by a vacuum evaporation method, and a strip pattern of the deposited substance is formed employing a lift-off technique. Thereafter, the substrate 1 with the strip pattern is thermally treated at 950–1050° C. for 10–20 hours to diffuse the substance into the substrate 1 and form an optical waveguide having a width of 8–11 μm.

Subsequently, a concave portion having a depth equal to the depth "d" to embed the buffer layer is formed in the superficial layer of the substrate 1 by dry-etching technique with electron cyclotron resonance (ECR) equipment through a Cr-mask. Thereafter, the Cr-mask is chemically removed, and a layer made of material such as silicon dioxide is formed, by sputtering, in a thickness of about 0.5–1.5 μm so as to embed the concave portion.

Then, as above-mentioned, the buffer layer 6 having the width "W" is formed by dry-etching through a Cr-mask.

Herein, in the case of embedding the ground electrodes 4 into the superficial layer of the substrate, concave portions having depths equal to the depth "D" to embed the ground electrodes is formed in the superficial layer of the substrate by the above dry-etching.

Subsequently, an underlayer made of a metallic material, such as Ti or nichrome, is deposited, by a vacuum evaporation method, in a thickness of about 0.05 μm entirely on substrate 1, and thereafter an electrode material layer, such as Au etc., is deposited, by a vacuum evaporation method, in a thickness of 0.2 μm on the underlayer.

Then, a photoresist is spin-coated in a thickness of about 25 μm on the electrode material layer, and thereafter is exposed and developed to form an electrode pattern. Next, the travelling wave-type signal electrode 3 having the width "ω" of 5 μm and ground electrode 4 are formed by electroplating having a thickness of 15–20 μm.

Then, the remaining photoresist is removed with an organic solvent such as acetone, and thereafter the parts of the underlayer and the electrode material layer exposed between the travelling wave-type signal electrode 3 and the ground electrodes 4 are chemically etched and removed using by applicable etchant, such as aqueous solution of iodine and potassium iodide for Au.

Herein, not shown in FIG. 5, a complete chip for optical waveguide modulator is mounted on a case made of stainless steel and electrical connectors bonded to the travelling wave-type signal electrode 3 and the ground electrodes 4. Finally, optical fibers are connected to the input and output ends of the optical waveguide 2.

Figure 10A:
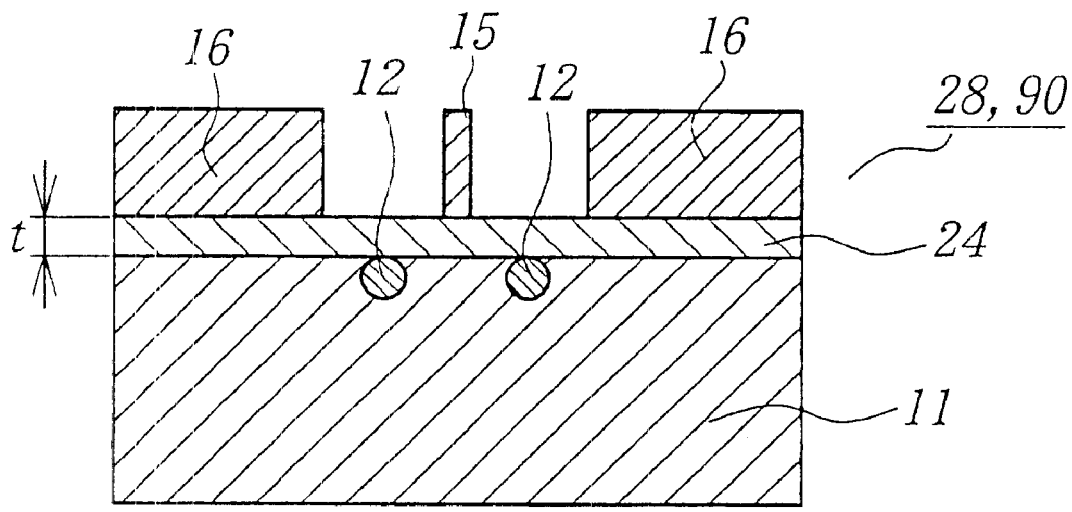
Figure 10B:
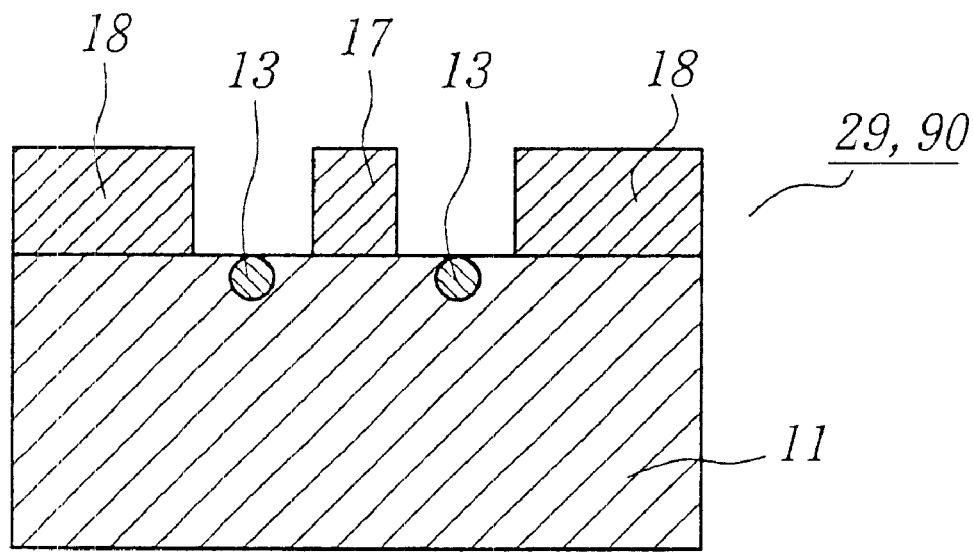

FIGS. 10(a) and 10(b) are cross sectional views showing another example of the optical waveguide modulator according to the present invention. FIGS. 10a and 10b show an optical modulation part and an attenuator part, respectively, corresponding to FIGS. 3a and 3b.

The configuration of the conventional optical waveguide modulator 30, shown in FIGS. 2 and 3, is different from that of the modulator 90, shown in FIGS. 10(a) and 10(b), in regards to with or without buffer layer in the attenuator part 29. Thus, the optical waveguide modulator 90 will be explained hereinafter with reference to FIGS. 2 and 10(a) and 10(b).

In the case that the optical waveguide modulator has the attenuator part according to the present invention, the thickness of the buffer layer in the attenuator part is required to be thinner than that in the optical modulation part. Moreover, the attenuator part 29 preferably has no buffer layer as shown in FIG. 10(b). Thereby, the driving voltage of the attenuator part is more reduced and the DC drift, due to the buffers layer is almost prevented.

In the case of forming the buffer layer in the attenuator part, proportion of it's thickness is preferably set to be not more than 0.5, more preferably to be not more than 0.3, when the thickness proportion of the buffer layer in the optical modulation part is set to be 1.

A buffer layer 24 and signal electrodes 15, 17 in the optical waveguide modulator 90, shown in FIGS. 2 and 10, may be made of the same materials as those in the modulator 40 shown in FIG. 5.

The optical waveguide modulator 90 shown in FIGS. 2 and 10 may be produced by fundamentally same process of the modulator 40 shown in FIG. 5. However, after the layer made of silicon dioxide, etc. is formed, only the part of the layer positioned in the attenuator part 29 is removed by dry-etching technique. Thus, the fabrication process of the modulator 90 is different from that of the modulator 40 in regard to the forming process of the buffer layer.

The optical waveguide modulator 90, shown in FIGS. 2 and 10 according to the present invention will be modulated as follows:

The lightwave having a wavelength $\lambda 1$, is incident into the waveguide 90, passing through metal-cladding type waveguide polarizer 23, and is on/off-switched by an effect of interference in the optical modulation part 28 as following manners.

A first Y-branch of the first Mach-Zehnder interferometer 12 splits the propagating lightwave into two equal beams. Their phases are electrooptically shifted in opposite direction during their propagation along the first Mach-Zehnder arms, and the phase-shifted beams are recombined in a second Y-branch of the first Mach-Zehnder interferometer 12.

If an electric field applied from the signal electrode 15 produces a phase shift of π radians between the two beams, they are cancelled due to interference. This condition represents a "off-state" of an optical signal in the communication system.

On the contrary, if the phase shift is zero or 2π radians, intensity of the recombined beams recovers to a level before splitting in the first Y-branch. In this condition, the optical signal is in a "on-state".

In the case of "on-state", the lightwave having the wavelength λ1 propagates into the attenuator part 29. Operation in the attenuator part 29 is basically same as that of the optical modulation part 28. An intensity of the propagating lightwave is attenuated by choosing appropriate operation point between the "on" and "off" states of the second interferometer 13. In this manner, the intensity of the propagating lightwave is adjusted to an optimum level in the communication system.

The intensity-adjusted lightwave passes through metal-cladding type waveguide polarizer 24 and is detected as an optical signal of a communication system. The communication system consists of multiple optical waveguide modulators, as above-mentioned, corresponding to lightwaves having different wavelengths and thereby intensity of every optical signal in the communication system is maintained to be constant.

According to the present invention, both of optical modulation part 28 and attenuator part 29, in the optical waveguide modulator 90 shown in FIGS. 2 and 10, modulate the intensity of the lightwave, as above-mentioned. Since the lightwave is modulated by the effect of interference, the optical waveguides in optical modulation part 28 and the attenuation part 29 has to be branched type.

In FIGS. 2 and 10, as a preferred embodiment of such a branched type optical waveguide, are exemplified the first and second Mach-Zehnder type interferometers 12 and 13. Instead of Mach-Zehnder interferometer, a directional coupler may be an alternative to the optical waveguide constituting the attenuator part 29.

Herein, the optical waveguide modulator 90 shown in FIGS. 2 and 10, has the metal-cladding type waveguide polarizers 23 and 24 at both its input and output sides of waveguide. However, the optical waveguide modulator, according to the present invention, does not always require a polarizer. Thus, a polarizer may be provided only in the input or the output in the optical waveguide modulator. Even though no polarizer is provided, the object of the present invention is sufficiently achieved.

EXAMPLES

This invention is concretely described on the examples, with reference to the drawings.

Example 1

In this example, the optical waveguide modulator 40 shown in FIG. 5, was fabricated.

The substrate 1 was made of an X-cut face of a lithium niobate. Then, a photoresist was spin-coated in a thickness of 0.5 μm on the main surface of the substrate 1, and was exposed and developed to form an optical waveguide pattern having a developed width of 7 μm.

Then, a layer made of Ti was deposited, by a vacuum evaporation method, in a thickness of 800 Å on the optical waveguide pattern and was thermally treated, in an electrical furnace, at 1000° C. for 10 hours to diffuse Ti into the substrate 1 and form the optical waveguide 2, having a width of 9 μm.

Subsequently, the concave portion having the depth "d" of 7 μm was formed in the superficial layer of the substrate 1 by an ECR dry-etching through a Cr-mask. Thereafter, a layer made of a silicon dioxide material was formed, by a sputtering method, in a thickness of 1 μm on the substrate 1 so as to cover the concave portion.

Then, after a Cr-mask was formed on the silicon dioxide-layer, the buffer layer 6 was patterned in the width "W" of 13 μm by ECR dry-etching.

After removing the Cr-mask, an underlayer made of Ti was deposited, by a vacuum evaporation method, in a thickness of 0.05 μm entirely on the substrate 1, and thereafter an evaporated layer made of Au was formed, in a thickness of 0.02 μm by a sputtering method.

Then, after a photoresist was spin-coated in a thickness of 25 μm on the Au evaporated layer, it was exposed and developed to form an electrode pattern. Then, an electroplating was performed with the electrode pattern to form an Au plated layer having a thickness of 15 μm. The Ti underlayer and Au layer were chemically etched to form the travelling wave-type signal electrode 3 having the width "ω" of 5 μm and the ground electrodes 4.

The complete chip 1 was mounted on a case made of a stainless steel (not shown) and optical fibers were connected to the input and output ends of the optical waveguides 2 (not shown).

The driving voltage of the fabricated optical modulator was 3.4V. And the characteristic impedance and the effective refractive index of microwave of the optical modulator were 55Ω and 2.4, respectively.

The microwave-propagation loss of the fabricated optical modulator scarcely degraded, nevertheless the modulator was exposed to the atmosphere for several days.

Example 2

In this example, the optical waveguide modulator 60, shown in FIG. 7, was fabricated.

The modulator was fabricated in almost same process though concave portions for embedding ground electrodes were additionally formed to have the depth "D" as 7 μm, employing an ECR dry-etching through a Cr-mask.

The driving voltage of the fabricated modulator was 3.0V. The characteristic impedance and the effective refractive index at microwave of the modulator were 51Ω and 2.4, respectively.

The microwave-propagation loss of the fabricated optical modulator scarcely degraded, nevertheless the modulator was exposed to the atmosphere for several days.

Comparative Example 1

Except for buffer layer 5, formed over the entire main surface 1a of the substrate 1, and without the removal of the buffer layer 6 by dry-etching, the optical waveguide modulator 10, shown in FIG. 1, was fabricated exactly as in the above examples.

The driving voltage of the modulator was 4.0V and the characteristic impedance and the effective refractive index of microwave were 54Ω and 2.4, respectively.

The propagation loss of the microwave in modulator was measured with time as above-mentioned. The result of measurement showed that electrical 3 dB-bandwidth was degraded from 10 GHz to 8 GHz after exposing the modulator in the atmosphere. That is, this optical modulator turned out to be degraded with time.

As is apparent from Examples 1, 2 and Comparative Example 1, the optical waveguide modulator according to the present invention can reduce its driving voltage though the modulator of the present invention has the same characteristic impedance and effective refractive index of microwave as those in the conventional modulator. And it is also shown that the modulator configuration of present invention successfully prevent its degradation with time derived from the increase of the propagation loss of microwave, because it is effective to prevent the moisture-absorption of the buffer layer.

Example 3

In this example, the optical waveguide modulator 90, shown in FIGS. 2 and 10, was fabricated by the above-mentioned process.

The substrate 11 was composed of an X-cut face of a lithium niobate. The first and second interferometers 12 and 13 were formed by thermal diffusion of Ti. The first signal electrode 15 and the first ground electrodes 16; the second signal electrode 17 and the second ground electrode 18 were formed by vacuum evaporation and thereafter plating of Au. The electrode length "L" of the first signal electrode 15 and the electrode length "l" of the second signal electrode 17 were 4 cm and 2 cm, respectively. The buffer layer 24, in the optical modulation part 28, made of silicon dioxide, was formed in a thickness of 1.1 $\mu$m.

The driving voltage of the fabricated optical waveguide modulator 90 was measured by applying a voltage to the second signal electrode 17, of the attenuator part 29, in the modulator 90. As a result, its half-wavelength voltage "V$\pi$" was 5.1 V.

The drift of the DC bias voltage with time, what is called as the DC drift, in the optical waveguide modulator 90 was measured by carrying out a high temperature-electric screening test at 80° C. The obtained results were shown in FIG. 11.

Figure 11:
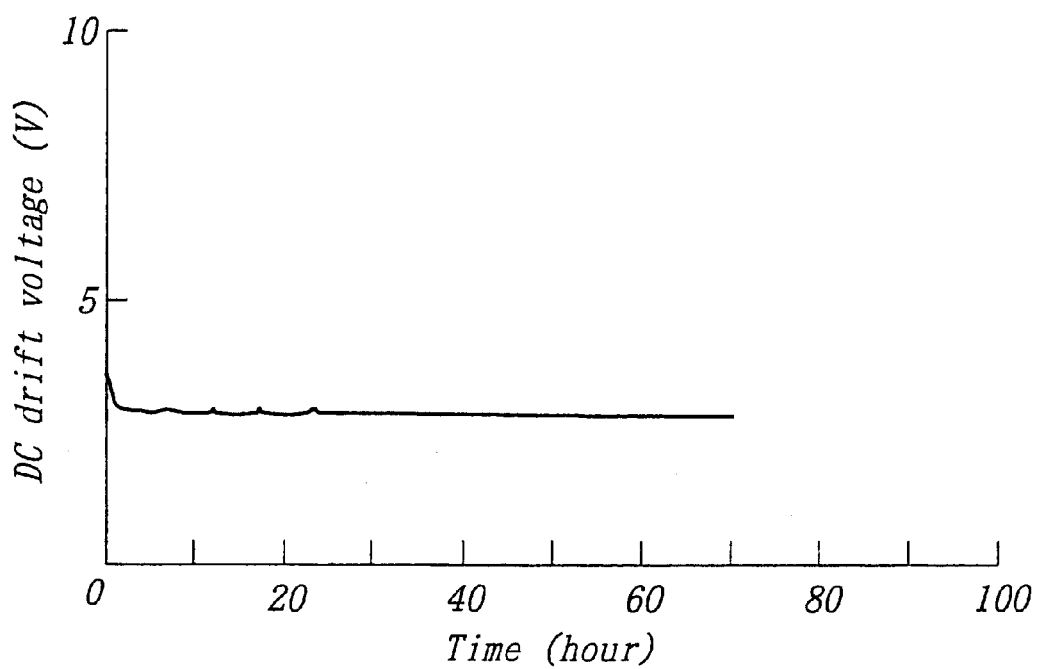
FIG. 11 is a graph showing the change with time of the DC drift voltage in the modulator according to the present invention, and FIG. 12 a graph showing the change with time of the DC drift voltage in the conventional modulator.

As is apparent from FIG. 11, the optical waveguide modulator according to the present invention does not exhibit the drift of its bias voltage with time, showing that the DC drift of the modulator has suppressed enough.

Comparative Example 2

In this comparative example, the optical waveguide modulator 30 shown in FIGS. 2 and 3 was fabricated by similar process as one in Example 3. However, the buffer layer 14 made of a silicon dioxide was formed uniformly in a thickness of 1.1 $\mu$m on the substrate 11, which is different process from the Example 3.

Figure 12:
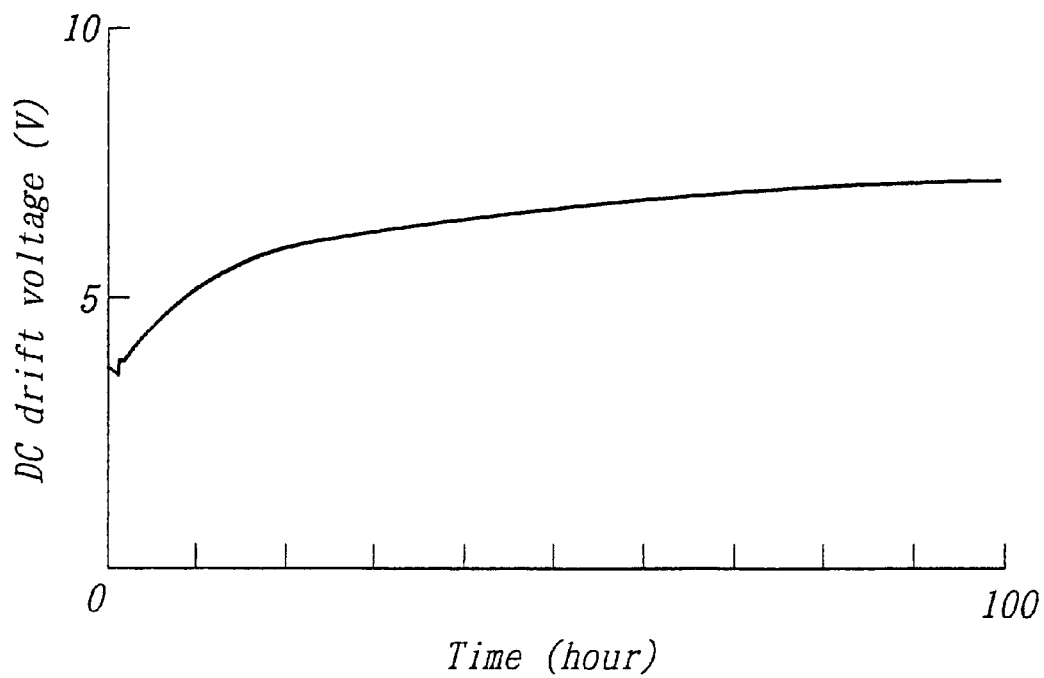

The driving voltage of the fabricated optical waveguide modulator 30 was measured by applying a voltage from the external electric power supply to the second signal electrode 17 of the attenuator part 29 in the modulator 30. As a result, its half-wavelength voltage "V$\pi$" was 11.4 V. As is apparent from FIG. 12, the DC drift voltage in the conventional optical waveguide modulator, is increased with time.

As is apparent from Example 3 and Comparative Example 2, the optical waveguide modulator, according to the present invention, can reduce its driving voltage in its attenuator part and prevent its DC drift.

As is explained above, the first optical waveguide modulator according to the present invention can reduce its driving voltage and enhance the modulation efficiency without increase of propagation loss of microwave and degradation of velocity matching.

Moreover, the second optical waveguide modulator having the attenuator part according to the present invention, can reduce the driving voltage of the attenuator part without damaging the function of the buffer layer preventing the lightwave-absorption of the electrodes.

Industrial Applicability

The first optical waveguide modulator may be used preferably for a waveguided optical intensity-modulators, a phase-modulators, a polarization scramblers, or the like in a high speed and large capacity-optical fiber communication system. Moreover, the second optical waveguide modulator having the attenuator according to the present invention may be used preferably for a WDM system.

What is claimed is:

1. An optical waveguide modulator comprising a substrate made of a material having an electrooptic effect, said substrate having a superficial layer, an optical waveguide to guide a lightwave, a travelling wave-type signal electrode, ground electrodes, and a buffer layer between the substrate and the electrodes, wherein the buffer layer is formed only under the travelling wave-type signal electrode and its nearby part so that it can have a larger width than that of the travelling wave-type signal electrode and at least a part of the buffer layer is embedded in the superficial layer of the substrate.

2. An optical waveguide modulator as defined in claim 1, wherein at least a part of the ground electrodes is embedded in the superficial layer of the substrate.

3. An optical waveguide modulator as defined in claim 1, wherein the width of the travelling wave-type signal electrode is narrower than that of the optical waveguide.

4. An optical waveguide modulator as defined in claim 1, wherein a passivating film is formed at least on the main surface of the buffer layer on which the travelling wave-type signal electrode is formed.

5. An optical waveguide modulator as defined in claim 4, wherein the passivating film is made of at least one of a nitride and a silicon.

6. An optical waveguide modulator comprising a substrate made of a material having an electrooptic effect, an optical modulation part including a first Mach-Zehnder interferometer and an electrode for modulation, and an attenuator part, a second branched optical waveguide connected in series with the first interferometer and an electrode for attenuating, further comprising a buffer layer on the substrate, the thickness of the buffer layer in the attenuator part being thinner than that of the buffer layer in the optical modulation part.

7. An optical waveguide modulator as defined in claim 6, wherein the buffer layer is not formed in the attenuator part.

8. An optical waveguide modulator as defined in claim 6, wherein the second optical waveguide is a Mach-Zehnder interferometer.

9. An optical waveguide modulator as defined in claim 6, wherein the second optical waveguide is a directional coupler.

* * * * *